United States Patent [19]
Tsuruta

[11] 3,716,822
[45] Feb. 13, 1973

[54] METHOD AND DEVICE FOR DETECTING RELATIVE SPEED BY USING SUPERSONIC WAVE

[76] Inventor: Yasuo Tsuruta, No. 12-22, 3-chome, Nakamagome, Ota-ku, Tokyo, Japan

[22] Filed: Sept. 21, 1970

[21] Appl. No.: 74,069

[30] Foreign Application Priority Data

Sept. 25, 1969 Japan ............................. 44/075803

[52] U.S. Cl. ..................... 340/1 R, 340/3 D, 340/53, 343/7 ED
[51] Int. Cl. ............................................... G01s 9/66
[58] Field of Search ........ 340/1 R, 3 D, 53; 343/7 ED

[56] References Cited

UNITED STATES PATENTS 3,094,693  6/1963  Taylor .................................. 340/3 D
3,394,342  7/1968  Walker ................................. 340/3 D
3,442,347  5/1969  Hodgson et al. ....................... 340/1 R
2,974,304  3/1961  Nordlund .............................. 340/3 D
3,152,326  10/1964 Merlo .................................. 343/7

Primary Examiner—Richard A. Farley
Attorney—Steinberg & Blake

[57] ABSTRACT

A method and device for detecting relative speed by using supersonic wave, wherein the change of cycle due to the Doppler effect of the sound wave reflected from an object moving relative to the sound source of supersonic wave is detected whereby the relative speed of the object is automatically detected and thus the safety mechanism of a transport machine such as an automobile is automatically controlled.

8 Claims, 4 Drawing Figures

PATENTED FEB 13 1973

3,716,822

INVENTOR
YASUO TSURUTA
BY Sternberg & Blake
ATTORNEYS

METHOD AND DEVICE FOR DETECTING RELATIVE SPEED BY USING SUPERSONIC WAVE

This invention relates to a method and device for automatically controlling the safety mechanism of a transport machine such as an automobile by detecting the relative speed of an object by using supersonic wave. A principal object of this invention is to perfectly prevent traffic collision by utilizing the Doppler effect of sound wave and thus detecting the relative speed of an object such as an automobile approaching a moving or stationary vehicle or the like.

The appended drawings are to illustrate a preferred embodiment of this invention, wherein.

To realize the foregoing object of this invention, an oscillator is installed at the front of a transport machine, the change of frequency of an echo of the sound wave which is continuously generated from the oscillator is detected whereby the speed of the echoing object moving relative to the transport machine is detected and thus the safety mechanism of the transport machine is automatically controlled. For this purpose a high frequency supersonic wave is used since, at a high frequency supersonic wave, the energy of sound wave is concentrated and the sensitivity is increased and, in addition, a high frequency supersonic wave can be easily discriminated from naturally existing sound waves.

Taking an automobile as example, a method and device of this invention will hereinafter be described by referring to the appended drawings.

Figure 1:
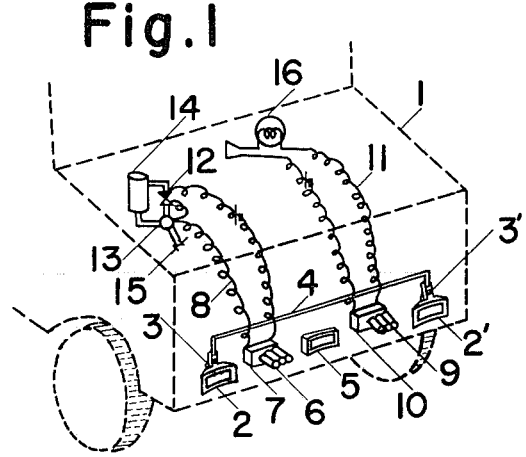
FIG. 1 is a schematic diagram showing an arrangement in which a device of this invention is installed at the front of an automobile.

In FIG. 1, a pair of supersonic oscillators 2 and 2' for oscillating a very high frequency supersonic wave (namely, a highly convergent megahertz range supersonic wave) are rotatively equipped at the pins 3 and 3', respectively, located at the front of a vehicle 1. The ends of the pins 3 and 3' are connected to each other by a link rod 4. By moving the rod 4 sideways, the supersonic focusing axes of the oscillators 2 and 2' can be deflected sideways. The oscillating areas of the oscillators 2 and 2' are concave so that the supersonic beams can reach afar without spreading outside the width and height of the vehicle.

The reference 5 denotes a supersonic oscillator for oscillating a low frequency supersonic wave having a lower convergence than that of the oscillators 2 and 2'. This supersonic oscillator 5 is equipped to the vehicle 1 and its oscillating area is concave as in the oscillators 2 and 2' so that its supersonic beam can reach afar without spreading outside the height of the vehicle. The reference 6 denotes a group of highly sensitive wave receivers each having a piezoelectric vibration element resonated with a supersonic wave whose frequency is higher by several percent than that of the supersonic wave oscillated from the oscillators 2 and 2'. 7 is a switch having a built-in amplifier which is to amplify a very small variable voltage produced in the group of wave receivers 6 and to close the circuit 8 according to the change of the variable voltage, and 9 is a group of highly sensitive wave receivers each having a piezoelectric vibration element resonated with a supersonic wave whose frequency is higher by several percent than that of the supersonic wave oscillated from the oscillator 5. 10 is an amplifier which is to amplify a very small variable voltage produced in the group of wave receivers 9 and to change the current flowing in the circuit 11 according to the variation in the very small voltage. 12 is a reverse flow check valve operated by the current flowing in the circuit 8, and 13 is an oil pump for sending oil to the brake pipe 15 from the oil tank 14. 16 is a lamp and horn operated by the current flowing in the circuit 11.

Figure 2:
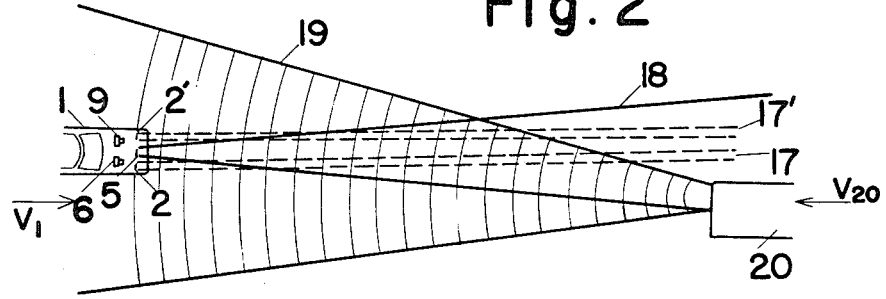
FIG. 2 is a plan view showing the functions of this invention on the occasion that an automobile is approaching another automobile having the device of this invention.

Assume that the vehicle 1 of FIG. 1, travelling at a speed of $V_1$, releases sound beams 17 and 17' forwardly from the supersonic oscillators 2 and 2' as shown in FIG. 2 and, at the same time, the vehicle 1 emits a sound beam 18 forward from the supersonic oscillator 5. Under this state, when another vehicle 20 travelling at a speed of $V_{20}$ enters the sound beam 18, then the sound beam 18 is reflected from the vehicle 20 and the echo is returned to the vehicle 1. In this case, when the vehicle 20 is moving toward the vehicle 1 at a relative speed of V (namely, $V = V_1 + V_{20}$) in the arrow direction in FIG. 2, the frequency of the reflected supersonic wave is higher than that of the emitted supersonic wave due to the Doppler effect. When assuming that the velocity of sound is $V$, the frequency of the oscillated sound wave is $n$, and the frequency of the reflected sound wave is $n'$, then $n' = n \cdot v/v - v$. Therefore, when the frequency resonated by the piezoelectric vibration element of the wave receiver 9 is made higher than the frequency of the supersonic wave oscillated from the oscillator 5, a variable voltage is produced in the wave receiver 9 by the sound pressure due to the echo 19. This voltage is amplified by the amplifier 10, the circuit 11 is closed to flow current, the lamp and horn 16 are operated, and thus the relative speed of the vehicle 20 toward the vehicle 1 is detected and an alarm is delivered. When a resistor is disposed in the amplifier 10 so that the current flowing in the circuit 11 is changed in response to the cycle of the variable voltage, then the change of relative speed of the vehicle 20 approaching to the vehicle 1 can be expressed in terms of sensitivity of the lamp and horn 16.

Figure 3:
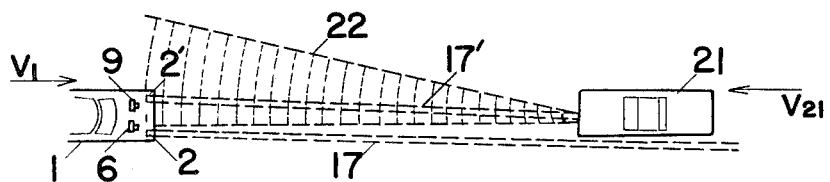
FIG. 3 is a plan view showing the functions of this invention on the occasion that an automobile is approaching and possibly coming into collision with another automobile equipped with the device of this invention.
Figure 4:
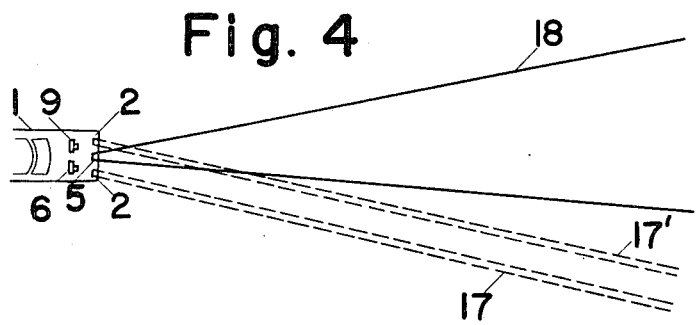
FIG. 4 is a plan view illustrating the functions of this invention on the occasion that a moving automobile equipped with the device of the invention changes its way.

As shown in FIG. 3, when a vehicle 21 comes in the sound beams 17 and 17', the supersonic wave of the sound beam is reflected from the vehicle 21, and an echo 22 is returned to the vehicle 1. When the vehicle 21 is moving toward the vehicle 1 in the arrow direction at a relative speed of $V_1'$ ($V_1' = V_1 + V_{21}$), the frequency of the reflected supersonic wave, namely the echo N' is expressed as follows.

$$N' = N \cdot V/V - v'$$

where $V$: the velocity of sound, $N$: the frequency of the oscillated sound wave When, therefore, the frequency at which the piezoelectric vibration element of the wave receiver 6 is resonated is made higher than that of the supersonic wave oscillated from the oscillators 2 and 2', a variable voltage is produced in the wave receivers 6 by the echo 19 due to the sound pressure. This variable voltage is amplified by the amplifier 7 to flow current in the circuit 8, the reverse flow check valve 12 and pump 13 are operated, and the oil in the oil tank 14 is sent out to the brake pipe 15. In other words, upon detecting the state that a vehicle 21 is moving straight toward the vehicle 1, the vehicle 1 is automatically braked. When a resistor is associated with the amplifier 7 so that the current flowing in the circuit 8 is changed in response to the cycle of the variable voltage, the output of the pump can be changed according to the speed at which the vehicle 21 is approaching the vehicle 1, and thus the braking force can be adjusted. The circuit 8 may be connected to the switch of the safety device such as the revolving shock bumper seat.

When the vehicle 1 is travelling along a curved line, the link rod 4 is moved opposite to the direction toward which the vehicle is head-ing whereby the oscillators 2 and 2' which oscillate strongly convergent supersonic waves are swung on the pins 3 and 3' toward the direction along which the vehicle is running. By this, the supersonic wave beams 17 and 17' can be directed to the curved line along which the vehicle is running.

The operation of the device of this invention installed on a vehicle has been described above. The device of this invention is similarly applicable to ships and aircrafts (flying at a speed below the sound velocity).

In short, according to this invention, the resonant frequencies of the piezoelectric vibration elements of the wave receivers are determined to be slightly different from each other in steps centering the frequency of the supersonic wave oscillated from the oscillator, and many of the piezoelectric vibration elements are installed on a vehicle or the like, the speed of an object moving relative to the vehicle is detected automatically and continuously upon detecting the frequency difference between the oscillated and reflected sound waves by using the piezoelectric elements designed to resonate with the difference frequency.

The device of this invention is capable of detecting the relative speed of an object, directly depending on the echo of the continuous sound wave, unlike the conventional sound detector in which the distance to an object is detected according to the product of the sound velocity and the echo time by using the echo of an intermittent sound wave. The device of this invention can therefore be effectively used even in the atmosphere in which the sound velocity is slow. In addition, the relative speed of an object can be accurately detected even if such object is in the close vicinity of the detector.

Thus, according to the method of the invention there is transmitted forwardly from the front end of the vehicle a first high-frequency signal of a convergence great enough to maintain the latter signal along the path of travel of the vehicle, and simultaneously there is transmitted a lower frequency signal of lesser convergence which spreads forwardly from the vehicle through an area sufficient to extend into locations beside the path to be travelled by the vehicle. When oncoming vehicles or the like engage either of these signals, they are reflected back and according to the method of the invention reflected signals are received with a reflection of the signal from lower frequency initiating the operation of an alarm to warn the operator of the vehicle from which the signals are transmitted while with the method of the invention when a reflected signal from the higher frequency and more convergent transmitted signal is received, there is an automatic operation in response to the latter reflected signal for automatically increasing the safety of the occupants of the vehicle from which the signals are transmitted.

According to the structure of the invention, a high-frequency transmitting transducer means, formed by components 2 and 2', transmits a signal of high frequency and high convergence to maintain the latter signal extending forwardly from the vehicle in the path of travel thereof, while a second, lower frequency transmitting transducer means 5 transmits forwardly from the vehicle a lower frequency signal which has a lesser convergence to provide with the latter signal a spread out beyond the actual path of travel of the vehicle to the opposite sides of the path of travel thereof. A pair of receiving transducer means carried by the vehicle at the front thereof for respectively receiving echo signals reflected back from the transmitted signals either by an object such as a vehicle travelling toward the transmitting vehicle directly in the path of travel of the latter, so that in this case the higher frequency signal is returned and received by a high-frequency receiving transducer means, while an oncoming vehicle or other object in the area beside but adjacent the actual path of travel of the vehicle will reflect back the wider, less-convergent signal of lower frequency so that in this case the latter signal is received by a second lower frequency receiving transducer means. The latter transducer means converts the received signal into an alarm by actuating automatically an alarm means to warn the operator of the transmitting vehicle of the presence of an object at a location close to the path of travel of the vehicle. The high-frequency receiving transducer means automatically actuates a control means which thus responds to the received signal for automatically controlling the vehicle in such a way as to increase the safety of the driver and any occupants of the transmitting vehicle.

While the principles of the invention have been described above in connection with one specific embodiment, and modifications thereof, it is to be clearly understood that this description is made only by way of example and not as a limitation on the scope of the invention.

I claim

1. In a method for increasing the safety with which a vehicle is operated, the steps of transmitting forwardly from the vehicle a signal of relatively high frequency and a convergence small enough to maintain the latter signal in the path of travel of the vehicle, simultaneously transmitting forwardly from the vehicle a second signal of a lower frequency and lesser convergence with the latter signal having a spread sufficient to extend into areas beside the path of travel of the vehicle, receiving a reflected echo of the high frequency signal when an object such as an oncoming vehicle is engaged by the high frequency signal, receiving an echo of said second signal when an object such as an oncoming vehicle is detected by the second signal in an area beside the path of travel of the signal-transmitting vehicle, automatically actuating a warning alarm in response to receiving the echo of the second signal, and automatically controlling the signal-transmitting vehicle in a manner protecting the latter and the occupants thereof in response to receiving an echo of the high-frequency signal.

2. In an apparatus for increasing the safety with which a vehicle is operated, a signal-transmitting vehicle, transmitting transducer means situated at the front of the latter vehicle for transmitting forwardly thereof in the path of travel of said vehicle a high-frequency signal of a convergence small enough to maintain the latter signal in the path along which the signal-transmitting vehicle travels, second transmitting transducer means carried by said signal-transmitting vehicle at the front thereof for transmitting forwardly from the latter vehicle a second signal of a lower frequency and lesser convergence which spreads to an extent sufficient to extend into areas beside the path of travel of the signal-transmitting vehicle, high-frequency receiving transducer means carried by said signal-transmitting vehicle at the front thereof for receiving the reflected echo of the high-frequency signal when an object such as an oncoming vehicle is situated directly in the path of travel of the signal-transmitting vehicle, second receiving transducer means for receiving a reflected echo of said second signal when an object such as an oncoming vehicle is situated in an area beside the path of travel of the signal-transmitting vehicle to engage and reflect the second signal, alarm means operatively connected to said second receiving transducer means for responding automatically to receiving an echo of said second signal to create an alarm which warns the operator of the signal-transmitting vehicle of the presence of an oncoming object in an area beside the path of travel of the signal-transmitting vehicle, and automatic control means operatively connected with said high-frequency receiving transducer means for responding to reflection of said high-frequency signal to automatically control the signal-transmitting vehicle in a manner which will protect the signal-transmitting vehicle and the occupants thereof.

3. The combination of claim 2 and wherein said high-frequency transmitting transducer means and said second transmitting transducer means are both supersonic oscillators.

4. The combination of claim 3 and wherein said high-frequency receiving transducer means and said second receiving transducer means are both in the form of piezoelectric vibration elements for respectively responding to reflected sound waves of a given frequency.

5. The combination of claim 4 and wherein said control means is a brake-operating means for responding to said high-frequency receiving transducer means for automatically actuating the brakes of the vehicle.

6. The combination of claim 2 and wherein said high-frequency transmitting transducer means includes a pair of signal-transmitting oscillators situated at the front of the signal-transmitting vehicle but respectively adjacent opposite sides thereof, said second transmitting transducer means being situated between the latter pair of oscillators.

7. The combination of claim 6 and wherein a means is operatively connected with said pair of oscillators for automatically springing the latter angularly into the path of travel of said signal-transmitting vehicle when the latter executes a turn.

8. The combination of claim 6 and wherein said high-frequency receiving transducer means is also situated between said pair of oscillators.

* * * * *